(12) United States Patent
Furuta et al.

(10) Patent No.: US 11,647,474 B2
(45) Date of Patent: May 9, 2023

(54) WIRELESS COMMUNICATION DEVICE AND SYSTEM

(71) Applicant: KABUSHIKI KAISHA TOKAI RIKA DENKI SEISAKUSHO, Aichi (JP)

(72) Inventors: Masateru Furuta, Aichi (JP); Tadashi Fukagai, Aichi (JP); Yuki Kono, Aichi (JP); Yutaka Kubo, Aichi (JP)

(73) Assignee: KABUSHIKI KAISHA TOKAI DENKI SEISAKUSHO, Aichi (JP)

(*) Notice: Subject to any disclaimer, the term of this patent is extended or adjusted under 35 U.S.C. 154(b) by 0 days.

(21) Appl. No.: 17/400,608

(22) Filed: Aug. 12, 2021

(65) Prior Publication Data

US 2022/0086785 A1 Mar. 17, 2022

(30) Foreign Application Priority Data

Sep. 11, 2020 (JP) ............................. JP2020-153198

(51) Int. Cl.
*H04W 56/00* (2009.01)
*H04B 1/7183* (2011.01)

(52) U.S. Cl.
CPC ...... *H04W 56/0045* (2013.01); *H04B 1/7183* (2013.01)

(58) Field of Classification Search
CPC ........ H04B 1/7183; H04B 2201/71634; H04B 17/364; H04W 56/0045; H04W 56/009; H04W 56/00; H04W 4/02; H04W 4/40; G01S 11/02; G01S 13/74; G01S 13/76; B60R 25/00
See application file for complete search history.

(56) References Cited

U.S. PATENT DOCUMENTS

| | | | |
|---|---|---|---|
| 2004/0135992 A1* | 7/2004 | Munro | G01S 17/10 356/4.01 |
| 2004/0142660 A1* | 7/2004 | Churan | H04B 7/18563 455/12.1 |
| 2005/0020279 A1* | 1/2005 | Markhovsky | G01S 5/12 455/456.1 |
| 2006/0012476 A1* | 1/2006 | Markhovsky | G01S 13/74 342/146 |
| 2006/0104198 A1* | 5/2006 | Takano | G01S 13/765 370/210 |
| 2007/0164728 A1* | 7/2007 | Muljono | G01R 31/3016 714/700 |

(Continued)

FOREIGN PATENT DOCUMENTS

JP 2020-118030 8/2020

*Primary Examiner* — Nathan S Taylor
(74) *Attorney, Agent, or Firm* — Greenblum & Bernstein, P.L.C.

(57) ABSTRACT

To calculate the propagation times of signals transmitted and received between the devices more easily and accurately.

There is provided a wireless communication device comprising a control section configured to control transmission and reception of a wireless signal by an antenna in conformity with a designated communication standard, wherein the control section controls a timing of causing the antenna to transmit a second signal in response to a first signal received by the antenna, on a basis of fixed time and delay time related to internal transfer in the wireless communication device, the fixed time being decided in advance.

9 Claims, 4 Drawing Sheets

(56) References Cited

U.S. PATENT DOCUMENTS

| | | | |
|---|---|---|---|
| 2007/0233383 A1* | 10/2007 | Churan | G01S 19/21 |
| | | | 701/2 |
| 2010/0183063 A1* | 7/2010 | Fukagawa | H04B 17/27 |
| | | | 375/224 |
| 2019/0190635 A1* | 6/2019 | Goel | H04J 3/0644 |
| 2019/0239172 A1* | 8/2019 | Hampel | H04W 56/0065 |
| 2019/0256047 A1 | 8/2019 | Iwashita et al. | |
| 2021/0033737 A1* | 2/2021 | Younis | G01S 1/024 |
| 2021/0297965 A1* | 9/2021 | Irvine | H04W 56/0045 |

\* cited by examiner

WIRELESS COMMUNICATION DEVICE AND SYSTEM

CROSS REFERENCE TO RELATED APPLICATION(S)

This application is based upon and claims benefit of priority from Japanese Patent Application No. 2020-153198, filed on Sep. 11, 2020, the entire contents of which are incorporated herein by reference.

BACKGROUND

The present invention relates to a wireless communication device and a system.

In recent years, technologies of performing various kinds of processes in accordance with a result of transmitting/receiving a wireless signal between devices have been developed. For example, JP 2020-118030A discloses a technology of performing ranging between devices by using ultra-wideband (UWB) signals.

SUMMARY

To perform more accurate ranging in the above-described system, it is important to more accurately measure propagation times of signals transmitted and received between the devices. However, to calculate the propagation times more accurately, it is necessary to eliminate delay time related to internal transfer of the signal in each device.

Accordingly, the present invention is made in view of the aforementioned issue, and an object of the present invention is to calculate the propagation times of signals transmitted and received between the devices more easily and accurately.

To solve the above described problem, according to an aspect of the present invention, there is provided a wireless communication device comprising a control section configured to control transmission and reception of a wireless signal by an antenna in conformity with a designated communication standard, wherein the control section controls a timing of causing the antenna to transmit a second signal in response to a first signal received by the antenna, on a basis of fixed time and delay time related to internal transfer in the wireless communication device, the fixed time being decided in advance.

To solve the above described problem, according to another aspect of the present invention, there is provided a wireless communication device comprising a control section configured to control transmission and reception of a wireless signal by an antenna in conformity with a designated communication standard, wherein the control section calculates propagation time of a first signal and a second signal between the wireless communication device and another wireless communication device on a basis of fixed time and delay time related to internal transfer in the wireless communication device, the first signal being transmitted from the antenna, the second signal being transmitted from the other wireless communication device in response to the first signal, the fixed time being decided in advance.

To solve the above described problem, according to another aspect of the present invention, there is provided a system comprising: a first wireless communication device; and a second wireless communication device, wherein the first wireless communication device includes a first control section configured to control transmission and reception of a wireless signal by a first antenna in conformity with a designated communication standard, the first control section calculates propagation time of a first signal and a second signal between the first wireless communication device and the second wireless communication device on a basis of fixed time and first delay time related to internal transfer in the first wireless communication device, the first signal being transmitted from the first antenna, the second signal being transmitted from the second wireless communication device in response to the first signal, the fixed time being decided in advance, the second wireless communication device includes a second control section configured to control transmission and reception of a wireless signal by a second antenna in conformity with a designated communication standard, and the second control section controls a timing of causing the second antenna to transmit the second signal in response to the first signal received by the second antenna, on a basis of the fixed time and second delay time related to internal transfer in the second wireless communication device.

As described above, according to the present invention, it is possible to calculate propagation times of signals transmitted and received between devices more easily and accurately.

DETAILED DESCRIPTION OF THE EMBODIMENT(S)

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

1. Embodiment

1.1. System Configuration Example

Figure 1:
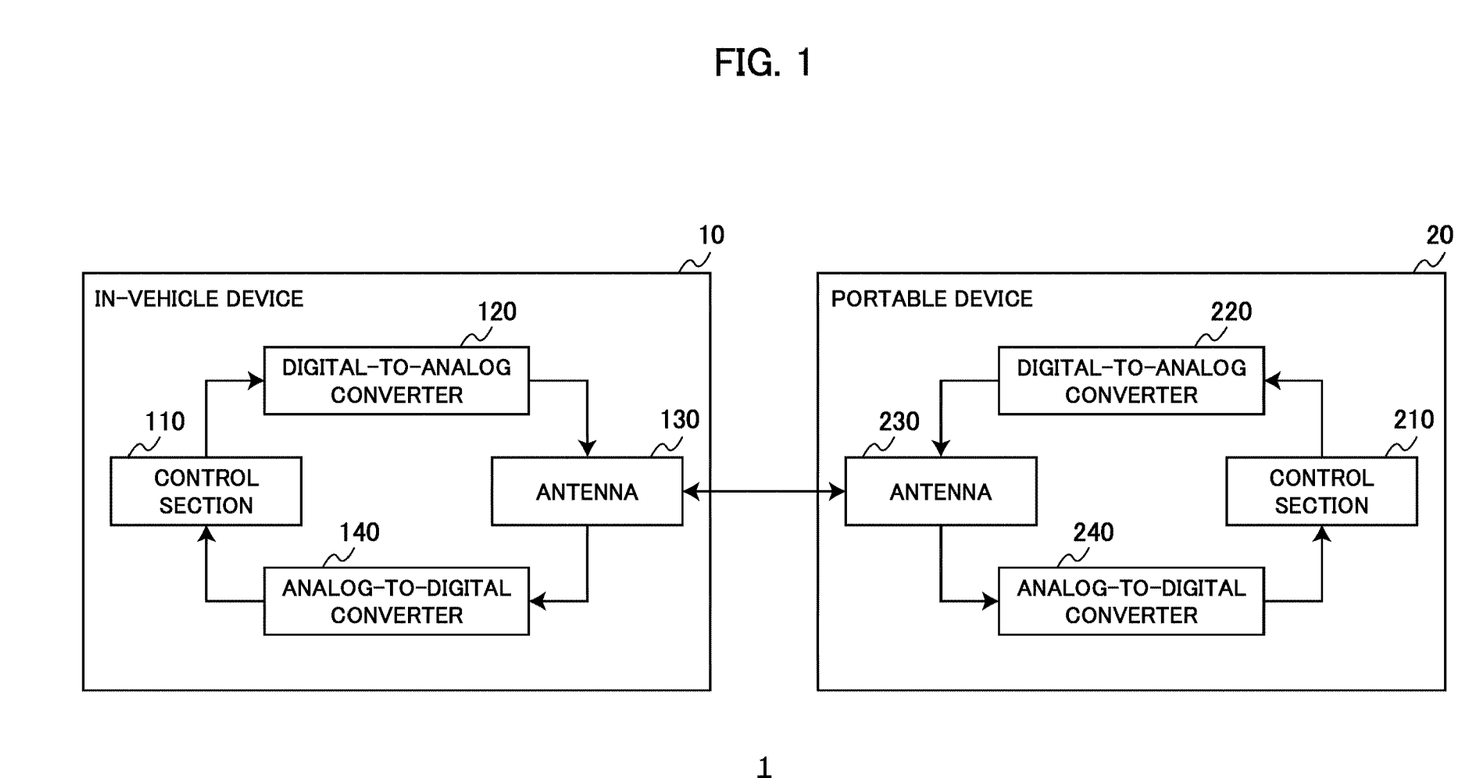
FIG. 1 is a block diagram illustrating a configuration example of a system 1 according to an embodiment of the present invention.

First, a configuration example of a system 1 according to an embodiment of the present invention will be described. FIG. 1 is a block diagram illustrating the configuration example of the system 1 according to the present embodiment.

As illustrated in FIG. 1, the system 1 according to the present embodiment includes an in-vehicle device 10 and a portable device 20.

(In-Vehicle Device 10)

The portable device 10 according to the present embodiment is an example of a first wireless communication device according to the present embodiment. The in-vehicle device 10 according to the present embodiment is installed in a mobile object such as a vehicle used by a user, and the in-vehicle device 10 performs wireless communication with the portable device 20 carried by the user in conformity with a designated communication standard.

As illustrated in FIG. 1, the in-vehicle device 10 according to the present embodiment includes a control section 110, a digital-to-analog converter 120, an antenna 130, and an analog-to-digital converter 140.

(Control Section 110)

The control section 110 according to the present embodiment controls transmission and reception of wireless signals by the antenna 130 in conformity with the designated communication standard.

In addition, the control section 110 according to the present embodiment calculates propagation time of the wireless signals between the in-vehicle device 10 and the portable device 20 (more specifically, between the antenna 130 of the in-vehicle device 10 and an antenna 230 of the portable device 20) in conformity with the designated communication standard.

Examples of the designated communication standard according to the present embodiment include ultra-wideband wireless communication. In this case, the control section 110 according to the present embodiment controls transmission and reception of ultra-wideband signals (hereinafter, also referred to as UWB signals) by the antenna 130.

On the other hand, the designated communication standard according to the present embodiment is not limited thereto. The examples of the designated communication standard according to the present embodiment include various kinds of communication standards that makes it possible to measure propagation time of signals between devices.

The functions of the control section 110 according to the present embodiment are implemented by a processor such as a CPU. Note that, details of the functions of the control section 110 according to the present embodiment will be described later.

(Digital-to-Analog Converter 120)

The digital-to-analog converter 120 according to the present embodiment converts an input digital signal into an analog signal.

The digital-to-analog converter 120 according to the present embodiment may convert a digital signal input from the control section 110 into an analog signal, and may output the analog signal to the antenna 130.

(Antenna 130)

The antenna 130 according to the present embodiment transmits and receives wireless signals in conformity with the designated communication standard. For example, under the control of the control section 110, the antenna 130 according to the present embodiment transmits a first signal, and receives a second signal transmitted from the portable device 20 in response to the first signal.

(Analog-to-Digital Converter 140)

The analog-to-digital converter 140 according to the present embodiment converts an input analog signal into a digital signal.

The analog-to-digital converter 140 according to the present embodiment may convert an analog signal input from the antenna 130 into a digital signal, and may output the digital signal to the control section 110.

(Portable Device 20)

The portable device 20 according to the present embodiment is an example of a second wireless communication device according to the present embodiment. The portable device 20 according to the present embodiment is carried by the user, and the portable device 20 performs wireless communication with the in-vehicle device 10 installed in the mobile object such as the vehicle used by the user in conformity with the designated communication standard.

For example, the portable device 20 according to the present embodiment may be a smartphone, a wearable device, a dedicated device, or the like.

As illustrated in FIG. 1, the portable device 20 according to the present embodiment includes a control section 210, a digital-to-analog converter 220, an antenna 230, and an analog-to-digital converter 240.

(Control Section 210)

The control section 210 according to the present embodiment controls transmission and reception of wireless signals by the antenna 230 in conformity with the designated communication standard.

For example, the control section 210 according to the present embodiment causes the antenna 230 to transmit the second signal in response to the first signal received by the antenna 230.

At this time, one of features of the control section 210 according to the present embodiment is to control a timing of causing the antenna 230 to transmit the second signal.

The functions of the control section 210 according to the present embodiment are implemented by a processor such as a CPU. Note that, details of the functions of the control section 210 according to the present embodiment will be described later.

(Digital-to-Analog Converter 220)

The digital-to-analogue converter 220 according to the present embodiment converts an input digital signal into an analog signal.

The digital-to-analog converter 220 according to the present embodiment may convert a digital signal input from the control section 210 into an analog signal, and may output the analog signal to the antenna 230.

(Antenna 230)

The antenna 230 according to the present embodiment transmits and receives wireless signals in conformity with the designated communication standard. For example, the antenna 230 according to the present embodiment receives the first signal transmitted from the in-vehicle device 10. In addition, for example, the antenna 230 according to the present embodiment transmits the second signal under the control of the control section 210.

(Analog-to-Digital Converter 240)

The analog-to-digital converter 240 according to the present embodiment converts an input analog signal into a digital signal.

The analog-to-digital converter 240 according to the present embodiment may convert an analog signal input from the antenna 230 into a digital signal, and may output the digital signal to the control section 210.

The configuration example of the system 1 according to the present embodiment has been described above. Note that, the configuration described above with reference to FIG. 1 is a mere example. The configuration of the system 1 according to the present embodiment is not limited thereto. The configuration of the system 1 according to the present embodiment may be flexibly modified in accordance with specifications and operations.

1.2. Details of Control

Next, details of the control of the system 1 according to the present embodiment will be described. Here, a method of calculating the propagation time of wireless signals between the in-vehicle device 10 and the portable device 20 will be described first.

Figure 2:
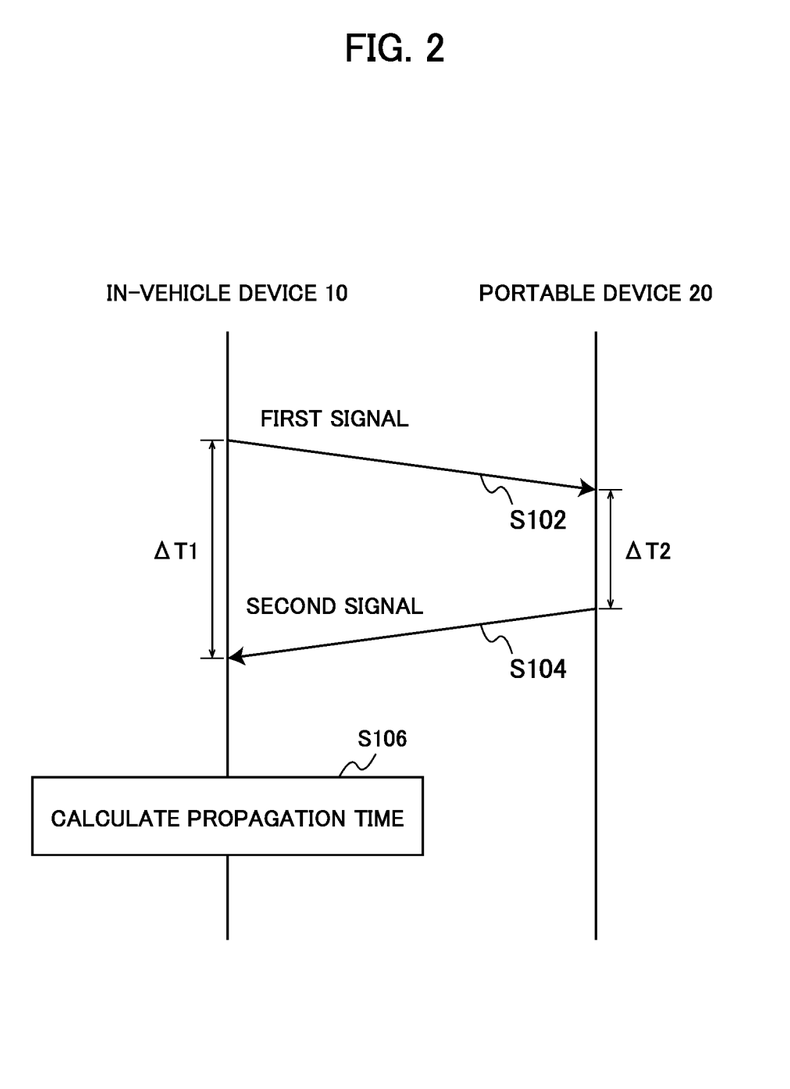
FIG. 2 is a sequence diagram for describing a method of calculating propagation time of wireless signals between an in-vehicle device 10 and a portable device 20 according to the embodiment.

FIG. 2 is a sequence diagram for describing the method of calculating propagation time of wireless signals between the in-vehicle device 10 and the portable device 20 according to the embodiment.

In the case of the example illustrated in FIG. 2, the antenna 130 of the in-vehicle device 10 first transmits the first signal in conformity with the designated communication standard under the control of the control section 110 (S102).

Next, on the basis that the antenna 230 has received the first signal in Step S102, the control section 210 of the portable device 20 causes the antenna 130 to transmit the second signal in response to the first signal and in conformity with the designated communication standard (Step S104).

Next, on the basis of the first signal transmitted from the antenna 130 in Step S102 and the second signal received by the antenna 130 in Step S104, the control section 110 of the in-vehicle device 10 calculates propagation time of the first signal and the second signal between the in-vehicle device 10 and the portable device 20 (Step S106).

At this time, it is possible for the control section 110 to calculate the propagation time on the basis of a time period ΔT1 and a time period ΔT2. The time period ΔT1 is time from when the antenna 130 transmits the first signal to when the antenna 130 receives the second signal. The time period ΔT2 is time from when the antenna 230 of the portable device 20 receives the first signal to when the antenna 230 transmits the second signal.

More specifically, it is possible for the control section 110 to calculate the time it takes to propagate the first signal and the second signal (that is, time it takes to perform round-trip communication) by subtracting the time period ΔT2 from the time period ΔT1. In addition it is possible for the control section 110 to calculate time it takes to propagate the first signal or the second signal (that is, time it takes to perform one-way communication) by dividing the calculated time by 2.

In addition, by multiplying the value obtained through (time period ΔT1–time period ΔT2)/2 by speed of the signals, it is possible for the control section 110 to calculate an estimation value of a distance between the in-vehicle device 10 and the portable device 20, that is, a ranging value.

Note that, at this time, to calculate the ranging value, it is necessary for the control section 110 of the in-vehicle device 10 to recognize the value of the time period ΔT2.

Accordingly, the control section 210 of the portable device 20 may include information related to the time period ΔT2 into the second signal or another signal and may cause the antenna 230 to transmit the signal.

On the other hand, it is also possible to omit such transmission of the information related to the time period ΔT2, by setting the time period ΔT2 as fixed time and sharing the fixed time between the in-vehicle device 10 and the portable device 20. The fixed time is time decided in advance.

In this case, after the antenna 230 has received the first signal, it is sufficient for the control section 210 of the portable device 210 to wait for the fixed time, which has been decided in advance, and then start the transmission process of the second signal.

However, to calculate the ranging value and the propagation time of signals more accurately here, it is important to consider respective delay times related to internal transfer of signals in the in-vehicle device 10 and the portable device 20.

For example, in the case of the in-vehicle device 10, delay occurs in time from when the control section 110 generates the first signal as a digital signal to when the antenna 130 emits the first signal as an analog signal. In addition, delay also occurs in time from when the antenna 130 receives the second signal as an analog signal to when the second signal is input to the control section 110 as a digital signal.

In a similar way, in the case of the portable device 20, delay occurs in time from when the antenna 230 receives the first signal as the analog signal to when the first signal is input to the control section 210 as the digital signal. In addition, delay also occurs in time from when the control section 210 generates the second signal to when the antenna 230 emits the second signal as the analog signal.

Therefore, even in the case of using the fixed time as described above, the calculated ranging value and propagation time of signals vary depending on the delay times.

The above-described delay time varies from device to device including the in-vehicle device 10 and the portable device 20. Therefore, to calculate accurate ranging values and accurate propagation time of signals, it is necessary to accurately measure delay time specific to each device and correct the delay time.

The present invention is made in view of the aforementioned issues, and the present invention makes it possible to calculate propagation time of signals transmitted and received between devices more easily and accurately.

Accordingly, one of features of the control section 210 of the portable device 20 according to an embodiment of the present invention is to control a timing of causing the antenna 230 to transmit the second signal in response to the first signal received by the antenna 230, on the basis of fixed time and delay time related to internal transfer of signals in the portable device 20. The fixed time is time decided in advance.

For example, after the antenna 230 has received the first signal, the control section 210 of the portable device 20 according to the present embodiment may wait for a time obtained by subtracting the delay time from the fixed time (fixed time–delay time) and then may start the transmission process of the second signal.

Note that, the above-described transmission process of the second signal may be started when the control section 210 generates the second signal as a digital signal and outputs the digital signal to the digital-to-analogue converter.

Such control makes it possible to more accurately calculate the ranging value and the propagation time of signals in view of the delay time in internal transfer of signals in the portable device 20.

In addition, one of features of the control section 110 of the in-vehicle device 10 according to the present embodiment is to calculate propagation time of the first signal transmitted from the antenna 130 and the second signal transmitted from the portable device 20 between the in-vehicle device 10 and the portable device 20 on the basis of the fixed time, which has been decided in advance, and the delay time in internal transfer of signals in the in-vehicle device 10.

For example, the control section 110 of the in-vehicle device 10 may calculate the propagation time of the first signal and the second signal between the in-vehicle device 10 and the portable device 20 by subtracting the delay time from time (time period ΔT1) from start of the transmission process of the first signal to confirmation of reception of the second signal and further subtracting the fixed time from the subtracted time.

In other words, the control section 100 makes it possible to calculate the propagation time of the first signal and the second signal by performing computation using (time period ΔT1−delay time)−fixed time.

Note that, the above-described transmission process of the second signal may be started when the control section 110 generates the first signal as a digital signal and outputs the digital signal to the digital-to-analogue converter.

In addition, the control section 110 may confirm reception of the second signal on the basis that the second signal received by the antenna 130 is converted into a digital signal by the analog-to-digital converter 240 and that the digital signal is input to the control section 110.

Such control makes it possible to more accurately calculate the ranging value and the propagation time of signals in view of the delay time in internal transfer of the signals in the portable device 20.

Figure 3:
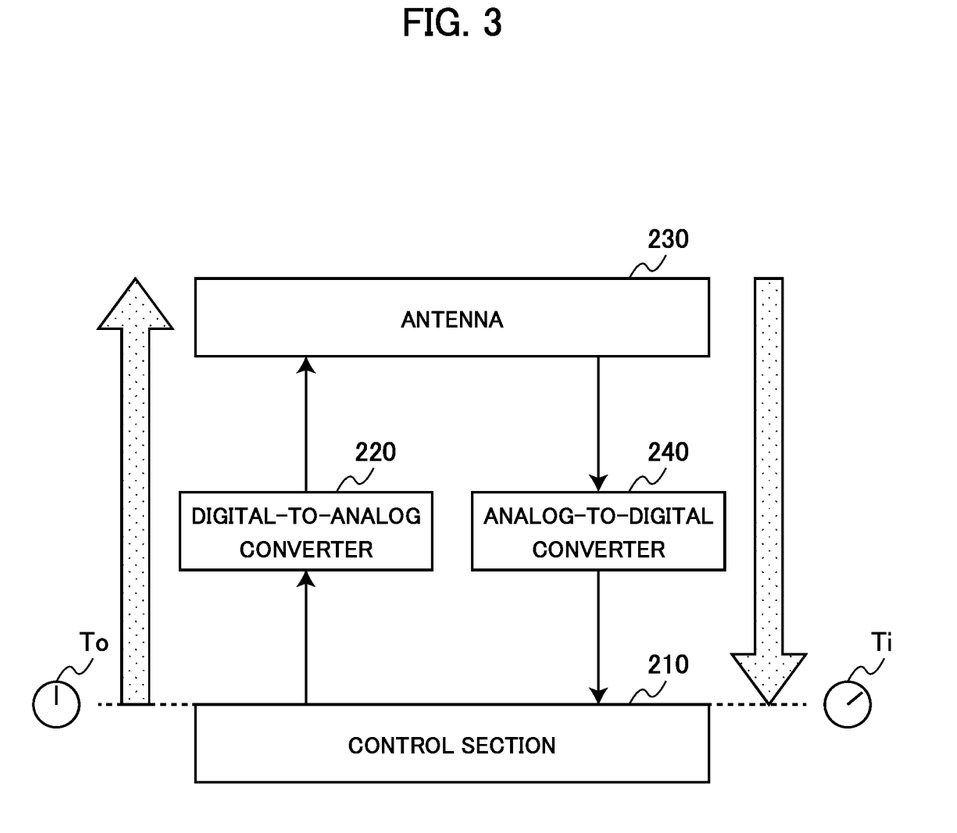
FIG. 3 is a diagram for describing calculation of delay time by a control section 210 of the portable device 20 with regard to internal transfer of signals in the portable device 20 according to the embodiment.

A method of calculating the delay time to perform the above-described control will be described. FIG. 3 is a diagram for describing calculation of delay time by the control section 210 of the portable device 20 with regard to internal transfer of signals in the portable device 20 according to the embodiment.

When calculating the delay time, the control section 210 first generates a digital signal and outputs the digital signal to the digital-to-analogue converter 220. At this time, the control section 210 stores time To of outputting the digital signal to the digital-to-analogue converter 220.

Next, the digital-to-analog converter 220 converts the input digital signal into an analog signal, and outputs the analog signal to the antenna 230.

Next, the antenna 230 emits the input analog signal and outputs the analog signal to the analog-to-digital converter 240.

Next, the analog-to-digital converter 240 converts the input analog signal into a digital signal, and outputs the digital signal to the control section 210.

Next, the control section 210 stores time Ti of inputting the digital signal output from the analog-to-digital converter 240 to the control section 210.

Next, the control section 210 calculates delay time, which is time from the time To of outputting the digital signal to the digital-to-analogue converter 220 to the time Ti of inputting the digital signal output from the analog-to-digital converter 240 to the control section 210.

By using the above-described calculation method, it is possible to accurately calculate delay time from when the antenna 230 receives the first signal to when the first signal is input to the control section 110 as a digital signal, and delay time from when the control section 210 outputs the second signal to the digital-to-analogue converter 220 as the digital signal to when the antenna 230 emits the second signal as an analog signal.

Note that, FIG. 3 exemplifies the case where the control section 210 of the portable device 20 calculates the delay time in internal transfer of signals in the portable device 20. However, it is also possible for the control section 110 of the in-vehicle device 10 to calculate delay time in internal transfer of signals in the in-vehicle device 10 by using a similar way.

In other words, the control section 110 of the in-vehicle device 10 may calculate the delay time, which is time from the time To of outputting the digital signal to the digital-to-analogue converter 120 to the time Ti of inputting the digital signal output from the analog-to-digital converter 140 to the control section 110.

By using the above-described calculation method, it is possible to accurately calculate delay time from when the control section 110 outputs the first signal to the digital-to-analogue converter 120 as the digital signal to when the antenna 130 emits the first signal as an analog signal, and delay time from when the antenna 130 receives the second signal to when the second signal is input to the control section 110 as a digital signal.

1.3. Flow of Operation

Figure 4:
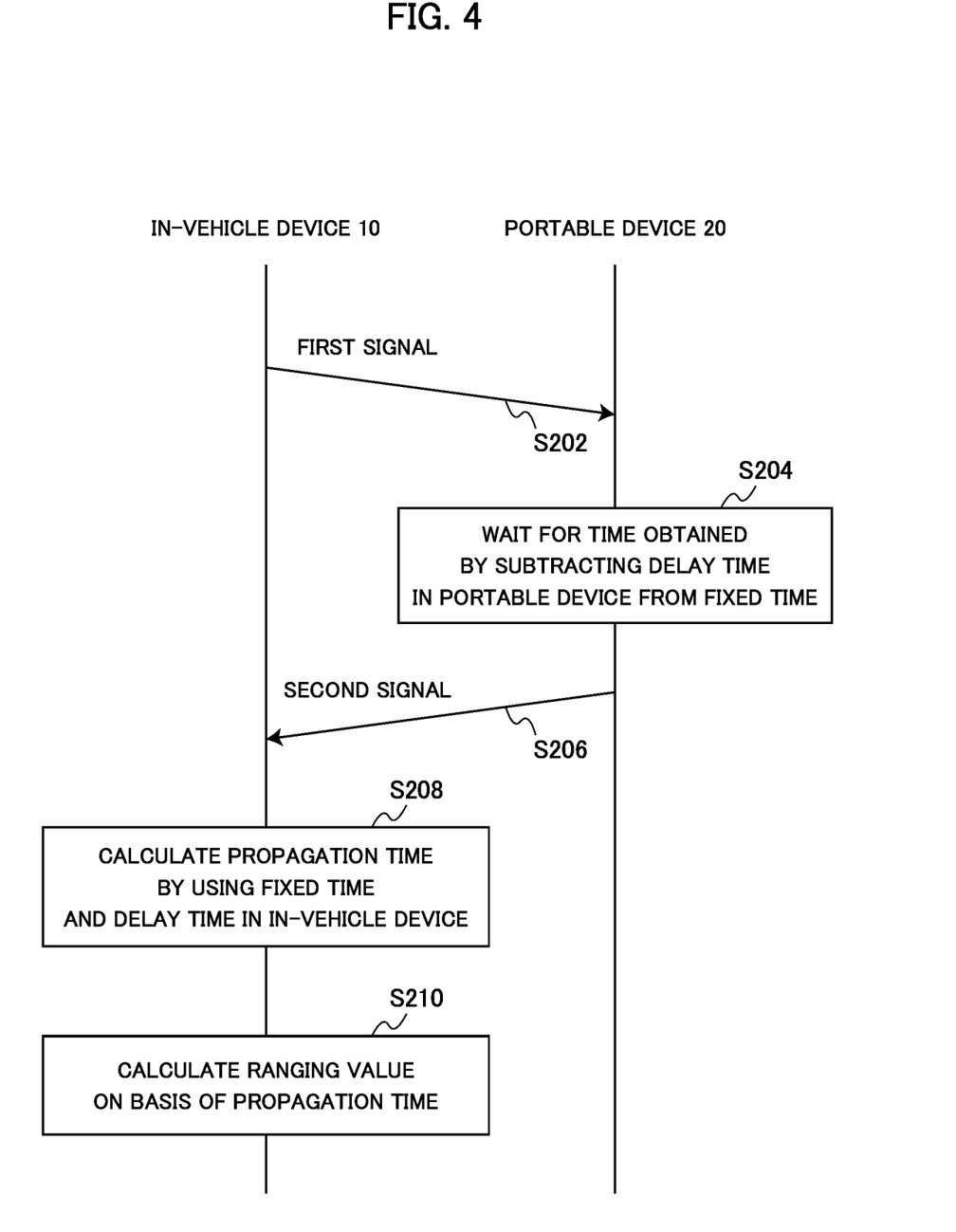
FIG. 4 is a sequence diagram illustrating an example of a flow of operation of the system 1 according to the embodiment.

Next, a flow of operation of the system 1 according to the present embodiment will be described in detail. FIG. 4 is a sequence diagram illustrating an example of the flow of the operation of the system 1 according to the present embodiment.

As illustrated in FIG. 1, the control section 110 of the in-vehicle device 10 first starts the transmission process of the first signal and cause the antenna 130 to transmit the first signal (Step S202).

Next, after the antenna 230 receives the first signal in Step S202, the control section 210 of the portable device 20 waits for a time obtained by subtracting the delay time in the portable device 20 from the fixed time (Step S204).

After the standby time in Step S204, the control section 210 of the portable device 20 starts the transmission process of the second signal and causes the antenna 230 to transmit the second signal (Step S206).

Next, the control section 110 of the in-vehicle device 10 calculates propagation time of the first signal and the second signal by using the time period ΔT1, the delay time in the in-vehicle device 10, and the fixed time (Step S208).

In addition, on the basis of the propagation time calculated in Step S208, the control section 110 of the in-vehicle device 10 calculates a ranging value of a distance between the in-vehicle device 10 and the portable device 20 (Step S210).

The example of the flow of operation of the system 1 according to the present embodiment has been described above. However, the flow of operation of the system 1 according to the present embodiment is not limited to the example illustrated in FIG. 4.

For example, the first signal according to the present embodiment may be transmitted from the portable device 20. In this case, the in-vehicle device 10 may transmit the second signal in response to the first signal transmitted from the portable device 20. In addition, the portable device 20 may calculate the propagation time and the ranging value on the basis of the second signal that has been received. The operation of the system 1 according to the present embodiment may be flexibly modified in accordance with specifications and operations.

2. Supplement

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

Note that, a series of processes performed by the respective devices described in this specification may be implemented by any of software, hardware, and a combination of software and hardware. A program that configures the software is stored in advance in, for example, a non-transitory computer readable storage medium installed inside or outside each of the devices. In addition, for example, when a computer executes each of the programs, the program is loaded into RAM, and executed by a processor such as a CPU. The storage medium may be a magnetic disk, an optical disc, a magneto-optical disc, flash memory, or the like, for example. Alternatively, the above-described computer program may be distributed via a network without using the storage medium, for example.

What is claimed is:

1. A wireless communication device comprising
a control section configured to control transmission and reception of a wireless signal by an antenna in conformity with a designated communication standard,
wherein the control section controls a timing of causing the antenna to transmit a second signal in response to a first signal received by the antenna, on a basis of fixed time and delay time related to internal transfer in the wireless communication device, the fixed time being decided in advance, and
wherein, after the antenna receives the first signal, the control section waits for a time obtained by subtracting the delay time from the fixed time, and then starts a transmission process of the second signal,
wherein the control section calculates the delay time, which is a time from when a digital signal is generated and the generated digital signal is output to a digital-to-analog converter to when the digital-to-analog converter converts the input digital signal into an analog signal and outputs the analog signal to the antenna, the antenna outputs the input analog signal to an analog-to-digital converter, the analog-to-digital converter converts the input analog signal into a digital signal and outputs the digital signal to the control section, and the digital signal is input to the control section.

2. The wireless communication device according to claim 1, wherein the propagation time of the first signal and the second signal is used for estimating a distance between the wireless communication device and another wireless communication device that transmits the first signal.

3. The wireless communication device according to claim 1,
wherein the fixed time is used for calculating propagation time of the first signal and the second signal between the wireless communication device and another wireless communication device that transmits the first signal.

4. The wireless communication device according to claim 1,
wherein the designated communication standard includes ultra-wideband wireless communication.

5. The wireless communication device according to claim 1,
wherein the wireless communication device is carried by a user.

6. A wireless communication device comprising
a control section configured to control transmission and reception of a wireless signal by an antenna in conformity with a designated communication standard,
wherein the control section calculates propagation time of a first signal and a second signal between the wireless communication device and another wireless communication device on a basis of fixed time and delay time related to internal transfer in the wireless communication device, the first signal being transmitted from the antenna, the second signal being transmitted from the other wireless communication device in response to the first signal, the fixed time being decided in advance, and
wherein, after the antenna receives the first signal, the control section waits for a time obtained by subtracting the delay time from the fixed time, and then starts a transmission process of the second signal,
wherein the control section calculates the delay time, which is a time from when a digital signal is generated and the generated digital signal is output to a digital-to-analog converter to when the digital-to-analog converter converts the input digital signal into an analog signal and outputs the analog signal to the antenna, the antenna outputs the input analog signal to an analog-to-digital converter, the analog-to-digital converter converts the input analog signal into a digital signal and outputs the digital signal to the control section, and the digital signal is input to the control section.

7. The wireless communication device according to claim 6,
wherein the control section calculates the propagation time of the first signal and the second signal between the wireless communication device and the other wireless communication device by subtracting the delay time from a time from start of a transmission process of the first signal to confirmation of reception of the second signal and further subtracting the fixed time from the subtracted time.

8. The wireless communication device according to claim 6,
wherein the wireless communication device is installed in a mobile object.

9. A system comprising:
a first wireless communication device; and
a second wireless communication device,
wherein the first wireless communication device includes a first control section configured to control transmission and reception of a wireless signal by a first antenna in conformity with a designated communication standard,
the first control section calculates propagation time of a first signal and a second signal between the first wireless communication device and the second wireless communication device on a basis of fixed time and first delay time related to internal transfer in the first wireless communication device, the first signal being transmitted from the first antenna, the second signal being transmitted from the second wireless communication device in response to the first signal, the fixed time being decided in advance, wherein, after the first antenna receives the first signal, the first control section waits for a time obtained by subtracting the first delay time from the fixed time, and then starts a transmission process of the second signal, wherein the first control section calculates the first delay time, which is a time from when a digital signal is generated and the generated digital signal is output to a digital-to-analog converter to when the digital-to-analog converter converts the input digital signal into an analog signal and outputs the analog signal to the antenna, the antenna outputs the input analog signal to an analog-to-digital converter, the analog-to-digital converter converts the input analog signal into a digital signal and outputs the digital signal to the first control section, and the digital signal is input to the first control section,
the second wireless communication device includes a second control section configured to control transmission and reception of a wireless signal by a second antenna in conformity with a designated communication standard, and the second control section controls a timing of causing the second antenna to transmit the second signal in response to the first signal received by the second antenna, on a basis of the fixed time and second delay time related to internal transfer in the second wireless communication device.

* * * * *